United States Patent [19]

Bajorek et al.

[11] Patent Number: 5,452,277

[45] Date of Patent: Sep. 19, 1995

[54] ADAPTIVE SYSTEM FOR OPTIMIZING DISK DRIVE POWER CONSUMPTION

[75] Inventors: Christopher H. Bajorek, Los Gatos, Calif.; Thomas W. Glaser, Rochester, Minn.; Klaas B. Klaassen; Charles R. Nielsen, both of San Jose, Calif.; George R. Santana, Saratoga, Calif.; Gordon J. Smith, Rochester, Minn.; David A. Thompson, San Jose, Calif.

[73] Assignee: International Business Machines Corporation, Armonk, N.Y.

[21] Appl. No.: 175,984

[22] Filed: Dec. 30, 1993

[51] Int. Cl.⁶ ............................................. G11B 19/00
[52] U.S. Cl. .................................... 369/54; 369/116; 360/69; 395/750
[58] Field of Search .......................... 369/116, 54, 124; 360/69, 70, 71, 60, 75, 99; 364/707; 395/750, 900

[56] References Cited

U.S. PATENT DOCUMENTS

| | | | |
|---|---|---|---|
| 4,161,002 | 7/1979 | Saito | 360/75 |
| 4,250,413 | 2/1981 | Kawasaki et al. | 307/293 |
| 4,269,496 | 5/1981 | Motoori et al. | 354/267 |
| 4,376,293 | 3/1983 | Teramura et al. | 360/71 |
| 4,635,145 | 1/1987 | Horie et al. | 360/78 |
| 4,636,905 | 1/1987 | Morimoto et al. | 360/69 |
| 4,649,373 | 3/1987 | Bland et al. | 340/365 |
| 4,684,864 | 8/1987 | Morimoto | 318/696 |
| 4,700,243 | 10/1987 | Tsuyuguchi et al. | 369/69 |
| 4,717,968 | 1/1988 | Painton et al. | 358/310 |
| 4,783,706 | 11/1988 | Shoji et al. | 360/78 |
| 4,933,785 | 6/1990 | Morehouse et al. | 360/78.04 |
| 4,980,836 | 12/1990 | Carter et al. | 364/483 |
| 4,991,129 | 2/1991 | Swartz | 364/707 |
| 5,005,088 | 4/1991 | Fukushima et al. | 360/69 |
| 5,185,734 | 2/1993 | Call et al. | 369/116 |

FOREIGN PATENT DOCUMENTS

| | | |
|---|---|---|
| 62-262265 | 11/1987 | Japan |
| 63-224078 | 9/1988 | Japan |
| 1-13253 | 1/1989 | Japan |
| 2-306483 | 12/1990 | Japan |
| 3-186073 | 8/1991 | Japan |
| 3-201261 | 9/1991 | Japan |
| 4-102261 | 4/1992 | Japan |

OTHER PUBLICATIONS

Nora Georgas, Premier Technologies Inc., "LiteDrive" (Disk storage device), Published Sep. 29, 1987, PC Magazine, vol: v6, issue: n16, p. 244.

M. Druffin, R. Fini and P. Vachee, "Hard and Soft Disk/Diskette Drives Powering Under Control of Microcode to Reduce Drive Failures", IBM Technical Disclosure Bulletin, vol. 31, No. 1, Jun. 1988, pp. 485-487.

R. C. Schwartz, "Method to Provide Lower Power Standby Mode for Online Devices", IBM Technical Disclosure Bulletin, vol. 29, No. 11, Apr. 1987, p. 4763.

*Primary Examiner*—W. R. Young
*Assistant Examiner*—Thang V. Tran
*Attorney, Agent, or Firm*—Baker, Maxham, Jester & Meador

[57] ABSTRACT

A disk drive power manager that compares energy usage with a predetermined profile to select one of several reduced-power operating modes. An energy usage register is updated at regular intervals according to the energy used during each time interval. An attenuated average energy usage value is obtained by attenuating the energy usage measures over time and integrating the results. The average energy level is compared with several predetermined energy threshold profiles to select a full- or reduced-power operating mode. Operating mode selection automatically adapts to the usage pattern to optimally balance power consumption with operational accessibility.

15 Claims, 6 Drawing Sheets

| OPERATING MODE | MODE CONTROLLER COMMAND SIGNALS |
|---|---|
| 0 | FULL POWER OPERATION |
| 1 | REDUCE μP CLOCK TO HALF-POWER |
| 2 | REDUCE SPINDLE MOTOR TO HALF-POWER |
| 3 | REMOVE ALL μP POWER |
| 4 | REMOVE ALL SPINDLE MOTOR POWER |
| 5 | POWER TO MODE CONTROLLER ONLY (SLEEP) |

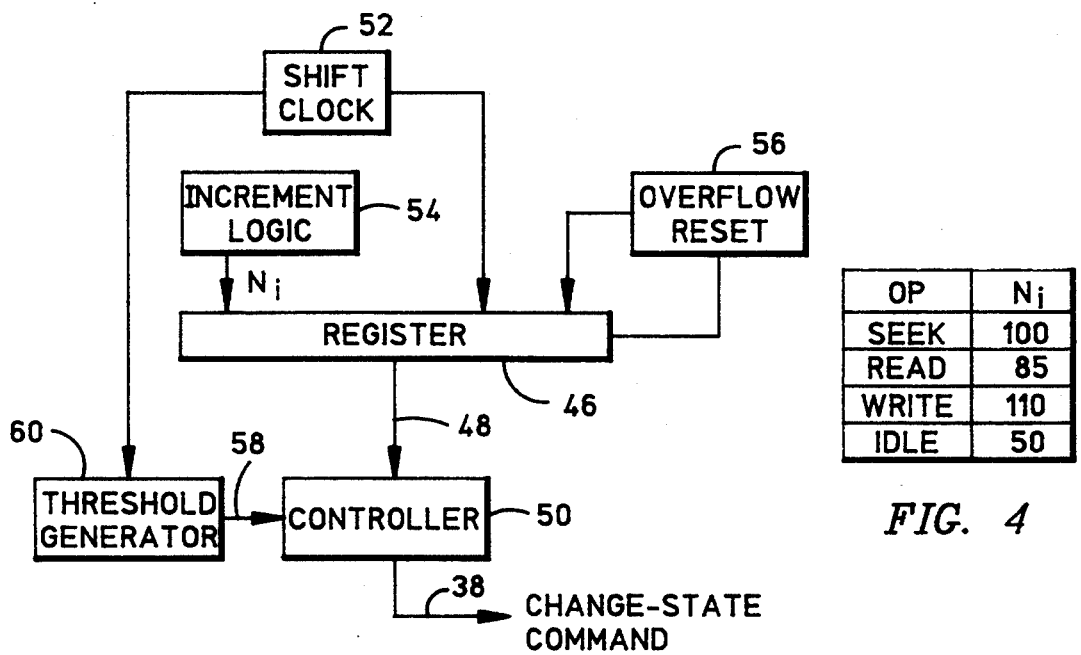
FIG. 3
| OP | $N_i$ |
|---|---|
| SEEK | 100 |
| READ | 85 |
| WRITE | 110 |
| IDLE | 50 |
FIG. 4
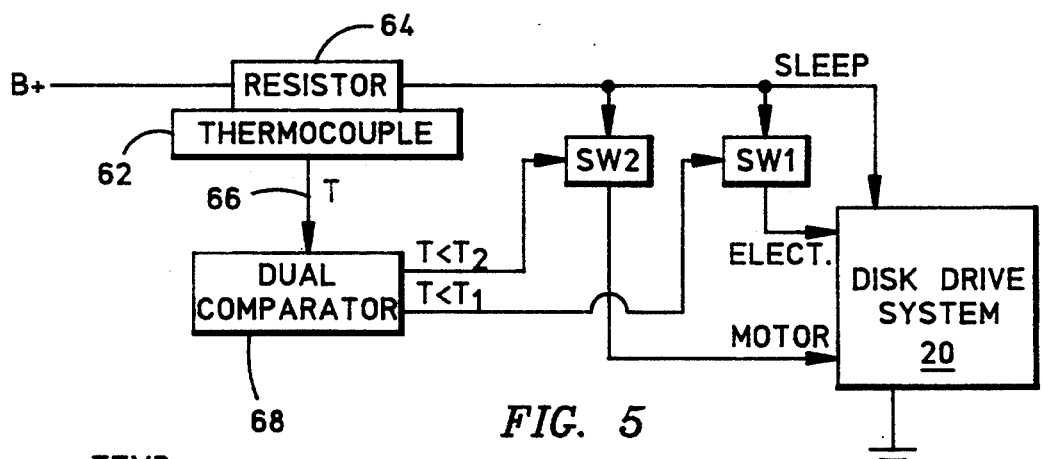
FIG. 5
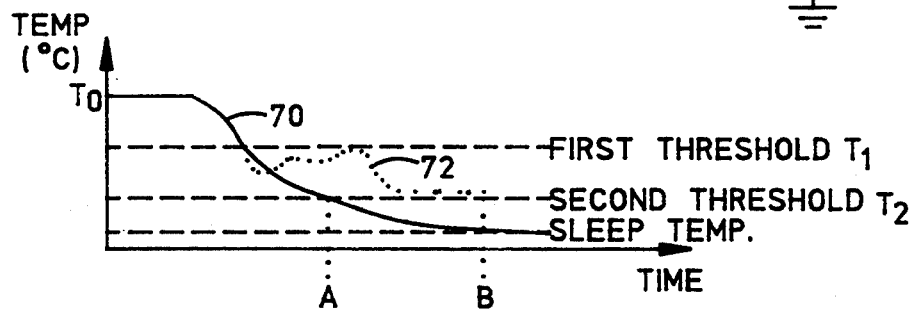
FIG. 6A

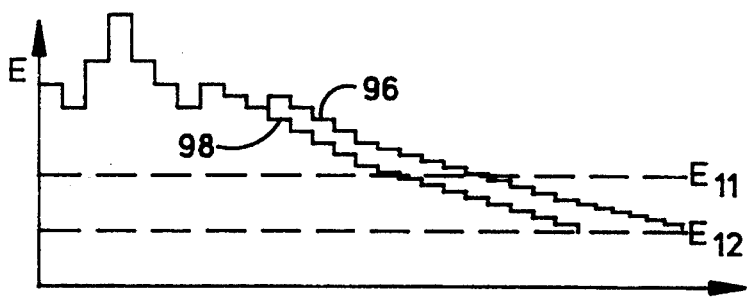
FIG. 9
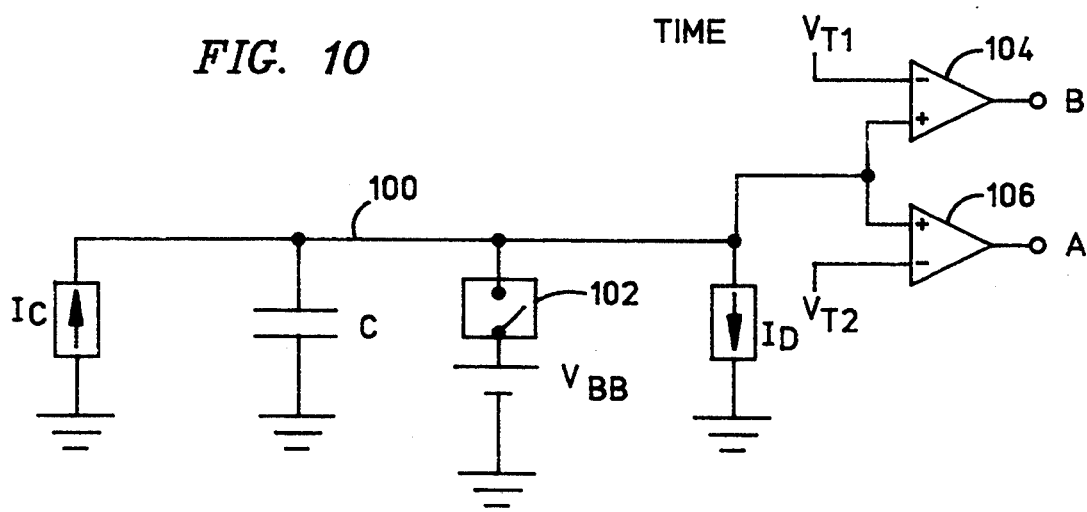
FIG. 10
FIG. 11
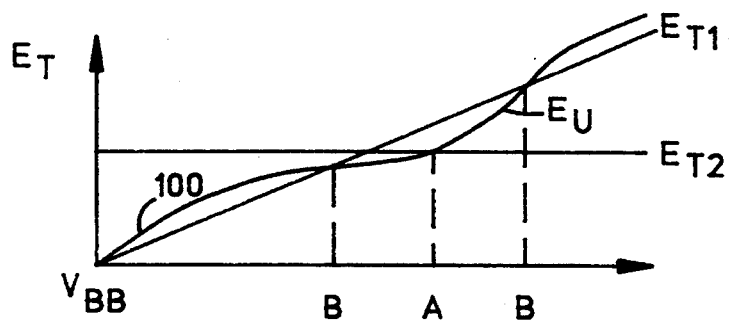
FIG. 12

ADAPTIVE SYSTEM FOR OPTIMIZING DISK DRIVE POWER CONSUMPTION

BACKGROUND OF THE INVENTION

1. Field of the Invention

This invention relates generally to a disk drive power management system for application to low-power computer systems and specifically to a powered-down mode sequencer that adapts to recent usage patterns.

2. Description of the Related Art

Recent improvements in computer hardware technology have led to computer systems wherein the disk drive data storage device consumes more power generally than other hardware elements such as the memory and microprocessor. It is generally desirable to reduce the power consumption of an inactive disk drive apparatus in some manner, such as by switching it to a state of reduced readiness that consumes less power than a fully functional disk drive state. Such practice also reduces the duty cycle for the disk drive apparatus, thereby improving service life and reliability. The recent popularity of battery-powered laptop computers and notebook computers has made disk drive power management even more important and desirable.

As used herein, the management of disk drive power consumption refers to Direct Access Storage Devices (DASDs) such as rigid magnetic disk drives as well as optical mass storage disk drives and other related apparatus. The problem of disk drive power management is also well-known in the digital imaging arts, including magnetic drives for digital imaging still cameras and portable video tape recording apparatus. These arts rely on small, portable recording devices powered by small, light batteries having low energy storage capacity. Thus, effective power management is crucial to the usefulness of such apparatus.

For instance, in U.S. Pat. No. 4,161,002, Isao Saito discloses a battery-operable tape recorder that reduces the rotary magnetic head drive power during the pause mode to reduce power consumption. In U.S. Pat. No. 4,717,968, Richard C. Painton et al. disclose a magnetic video disk player for the storage and reproduction of still photographs that is automatically cycled into a special quiescent state after a predetermined time interval elapses without user instructions. The disk drive spindle motor is stopped in the quiescent state to conserve power and reduce disk wear. In Japanese patent JP03-186073, Kazu Saito discloses an automatic power switch that shuts down a digital imaging recording and reproducing apparatus when no operation is performed during a first fixed time interval when a storage medium is present and during a second shorter fixed time interval when a recording medium is absent from the device. Other fixed-delay power supply circuit interrupters for battery-powered cameras are disclosed in U.S. Pat. Nos. 4,250,413 and 4,269,496.

The power management of floppy disk drives has been known for many years. For instance, in U.S. Pat. No. 4,376,293, Nobuyasu Teramura et al. disclose a magnetic disk device wherein the spindle driving circuit is automatically energized when the disk is mounted on the spindle and automatically de-energized after a predetermined time interval thereafter to ensure proper disk centering and optimal power consumption. In U.S. Pat. No. 4,635,145, Nobuyauki Horie et al. disclose a floppy disk drive system with a stand-by mode in which power is removed from the drive circuits for the head-positioning motor and spindle motors when no motor-activating signal is received during a predetermined time interval. Similar arrangements are disclosed in U.S. Pat. Nos. 4,684,864 and 4,783,706 as well as Japanese patents JP01-013253 and JP62-262265. All practitioners suggest fixed delay time intervals for powering-down functions.

Practitioners have also suggested many useful methods for power management in rigid disk drive systems such as DASD and the like. For instance, in U.S. Pat. No. 4,991,129, Jack S. Swartz discloses a dual mode actuator for disk drive applications in portable computers. Swartz teaches the use of a lower operating voltage and power when the system is battery-powered and a higher operating voltage and power when the system is powered by commercial electricity. In Japanese patent JP04-102261, Hisatoshi Katahara teaches a dual-mode rigid disk power-down technique where contact surface stiction (CSS) is avoided by keeping the head "floating" above the disk when the primary apparatus power is disabled during a low-power operating mode by occasionally "kicking" it to keep the disk turning. In Japanese patent JP02-306483, Eiji Chigusa teaches a two-valued delay time interval scheme where the head actuator motor only is powered-down after the elapse of a first time interval and the spindle drive system is powered-down after the elapse of a second longer time interval. Finally, in Japanese patent JP02-306483, Kazuo Kawasaki discloses a CSS and power control scheme wherein the head is moved to a landing zone and the spindle motor power is disconnected after elapse of a single fixed time interval following the previous disk access.

The usual practice in the art is now to stop the spindle motor and power-down most of the electronics shortly after completion of an operation in a floppy disk drive. Similarly, in rigid disk drives, it has become a standard practice in the art to offer one or two reduced power operative modes with associated fixed delay time intervals. For instance, a review of the Premier Technology LiteDrive (PC Magazine, vol. 6, no. 16, p. 244, Sep. 29, 1987) discloses the power management technique where the user specifies a fixed time delay interval for powering down the LiteDrive. M. Druffin et al. (IBM Technical Disclosure Bulletin, vol. 31, no. 1, pp. 485–7, June 1988) suggests a power-manager system in microcode for both rigid and floppy disk drives that powers-down the drive under microcode Control after a ten minute delay time interval without user access. R. C. Swartz (IBM Technical Disclosure Bulletin, vol. 29, no. 11, p. 4763, April 1987) suggests a low power standby mode that can be entered either by default after a fixed time interval or actively under program control. In U.S. Pat. No. 4,980,836, Robert R. Carter et al. disclose a power consumption control system for battery-powered computers that monitors the address bus to discover when selected peripheral devices have not been accessed for a preset delay time interval, powering-down the entire system and stopping the system clock to enter a standby mode after the preset delay time interval has elapsed. The Carter et al. system is awakened by depressing a standby switch rather than by requesting peripheral device access. Japanese patent JP63-224078 also discloses an interface circuit for entering a standby mode.

In U.S. Pat. No. 4,649,373, Patrick M. Bland et al. disclose a self-contained battery-powered keyboard entry device that uses a microprocessor to conserve power by automatically powering-down to a standby mode between keystrokes. In U.S. Pat. No. 4,933,785, James H. Morehouse et al. disclose a disk drive apparatus that includes hardware and software for reducing power consumption. Morehouse et al. suggest removing power from the drive control electronics after a predetermined delay time interval without an incoming disk access request. After an additional second predetermined delay time interval, the spindle motor power is next removed. By removing control electronics power before removing spindle motor power, Morehouse et al. acknowledge that more time is required to restore spindle speed following motor shutdown than to restore controller power. Unfortunately, the Morehouse et al. method is not optimal because a predetermined delay time interval following the most recent disk access is not a particularly useful indicator of the probability that another disk access request is imminent. Also, powering-down selected separately-powered components is not necessarily the best way to reduce disk drive power consumption because the capacity to quickly restore full disk operability is also an important user requirement.

Although portable computers could provide several control levels for finding a useful tradeoff between power consumption and performance, the first level in the art is still the human user, who may disable functions that are not needed and who can specify to the control program the degree of performance degradation acceptable in exchange for reducing power consumption. The next control level is the computer control program, which uses clock data, user inputs and default values to decide when to send shut-off and readiness mode commands to individual separately-powered components in the system. Finally, the separately-powered elements may each decide, from internal and external instructions, when to reduce power by going to a lower-power operating mode. However, in the art, the system and subsystem decisions to shift to lower levels of readiness are made solely in terms of a predetermined delay time interval since last use. Also, the powered-down operating mode for separately-powered elements is the "zero-power" operating mode and not a "reduced-power" operating mode.

Finding the best strategy for selecting from among several powered-down operating modes is usually seen as a problem that is separate and generally independent of finding the likelihood of an imminent new disk access request. However, coordinated solutions to both problems are necessary to optimize disk power consumption even though they present independent issues. For instance, both the microprocessor and the drive spindle motor could be operated at a reduced power to conserve energy while also offering rapid restoration to full power operation. The decision to operate at reduced power should consider the present likelihood that the host is engaged in activity that will soon result in a new disk access request. The method for establishing such likelihood is additional to the techniques for optimizing power-down mode sequences.

There is accordingly a clearly-felt need in the art for a system that can establish the optimal balance between reduced power consumption and immediate disk drive accessibility. Even those practitioners who suggest sophisticated multi-mode power-down schemes rely on fixed delay time intervals, whether predetermined or user-specified. Furthermore, the order of transition through several reduced-power operating modes is nonadaptive and predetermined according to all known power-management systems, none of which provide any means for adapting the power-down sequence or schedule to changes in the likelihood of an imminent command for disk access. These unresolved problems and deficiencies are clearly felt in the an and are solved by this invention in the manner described below.

SUMMARY OF THE INVENTION

This invention solves the above problems by measuring energy consumption history to establish the likelihood of imminent disk access and by establishing reduced power consumption modes in the controller electronics through reduced clock rates, which provide degraded controller performance that can be used to maintain degraded motor speed control and track positioning during power-down. This invention arises from the unexpectedly advantageous observation that energy consumption is the best measure of the likelihood of new disk accesses. The average energy consumption level indicates how busy the device has been in the recent past and, therefore, is indicative of how busy the device is likely to be in the immediate future. This invention compares the average energy consumption profile with predetermined energy threshold profiles to trigger operating power mode changes. The energy threshold profiles can be predetermined either by default or by user specification.

It is an object of this invention to adapt the power-down timing to recent device access history. It is a feature of this invention that the effective delay time interval between last access and power-down is adaptively increased responsive to recent busyness and decreased responsive to recent disuse.

It is another object of this invention to provide a variety of reduced-power modes from which full operating capacity can be rapidly retrieved. It is an advantageous feature of this invention that the early reduced-power modes involve operating the digital control electronics at reduced clock rates. In such condition, important disk drive operations, such as motor speed control and track positioning, can be monitored and controlled with only modest degradation, thereby permitting more rapid recovery to full operation.

The foregoing, together with other objects, features and advantages of this invention, will become more apparent when referring to the following specification, claims and the accompanying drawing.

BRIEF DESCRIPTION OF THE DRAWING

For a more complete understanding of this invention, reference is now made to the following detailed description of the embodiments as illustrated in the accompanying drawing, wherein:

FIG. 3 is a functional block diagram of an exemplary digital embodiment of the energy monitor used with the system of this invention;

FIG. 4 provides illustrative digital increment $N_j$ values suitable for use with the increment logic portion of the energy monitor of FIG. 3;

FIG. 5 is a functional block diagram of an exemplary analog embodiment of the energy monitor used with the system of this invention;

FIGS. 6A and 6B are charts illustrating the operation of the analog energy monitor of FIG. 5;

FIG. 9 is a table of exemplary energy increments $E_{OPj}$ suitable for use with the energy monitors of FIGS. 7–8;

FIG. 10 is a chart illustrating the operation of the digital energy monitor of this invention;

FIG. 11 shows a circuit diagram of an alternative analog embodiment of the energy monitor used with the system of this invention;

FIG. 12 is a chart illustrating the operation of the analog energy monitor circuit of FIG. 11.

DETAILED DESCRIPTION OF THE PREFERRED EMBODIMENTS

Figures 1, 2:
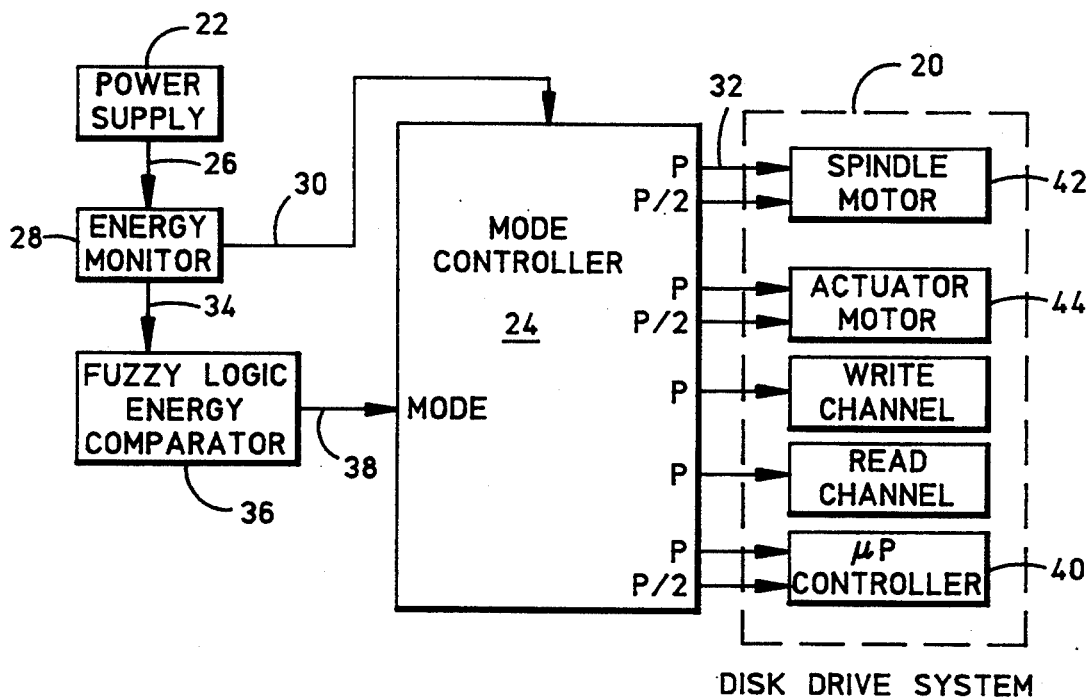
FIG. 1 is a functional block diagram of a preferred embodiment of the system of this invention.
FIG. 2 shows an illustrative set of reduced-power operating modes for use with the system of FIG. 1.

FIG. 1 shows a functional block diagram of the adaptive disk drive power management system of this invention. The disk drive system 20 receives its power from the power supply 22 by way of a mode controller 24. Power from power supply 22 is transferred on line 26 to an energy monitor 28 and therefrom on line 30 to mode controller 24. Mode controller 24 distributes power coming in on line 30 to disk drive system 20 on a variety of lines exemplified by line 32. Energy monitor 28 provides an energy usage signal 34 to a fuzzy logic energy comparator 36. Fuzzy logic comparator 36 generates a mode selection signal 38 and forwards it to mode controller 24 to effect the requisite powered-down operating mode. Thus, it can be appreciated that mode controller 24 selects a full-or reduced-power operating mode for disk drive system 20 responsive to mode selection signal 38 from fuzzy logic comparator 36.

FIG. 2 tabulates several useful powered-down operating modes for disk drive system 20. The operating mode assignments in FIG. 2 are for exemplary purposes only and disk drive system 20 may be operated in fewer or more such operating modes than those shown in FIG. 2. For example, operating mode-1 is shown in FIG. 2 as the earliest reduced-power mode after the full-power operating mode-0. Operating mode-1 is shown as a reduced-power microprocessor controller mode obtained by operating the microprocessor-clock at a reduced frequency. The next operating mode-2 reduces spindle motor power. Thus, for the exemplary operating modes shown in FIG. 2, mode controller 24 first reduces power to the microprocessor controller 40, thereby retaining sufficient control capacity to permit approximate management of the spindle motor 42 and the actuator motor 44. If disk drive system 20 receives a new access command during operating mode-1, it may return to full power operating mode-0 with minimal delay to reposition actuator motor 44, for instance.

Operating mode-2 in FIG. 2 powers down from operating mode-1 by reducing power to spindle motor 42, thereby reducing the speed of spindle motor 42. Thus, transitioning from reduced-power operating mode-2 up to full-power operating mode-0 in response to receipt of a new access command may be accomplished quickly by accelerating spindle motor 42 from half-speed instead of from full-stop. Similarly, operating mode-3 removes all power from microprocessor controller 40 while retaining half-speed operation of spindle motor 42. Only at reduced-power operating mode-4 is all power removed from spindle motor 42, bringing it to a full stop. Finally, operating mode-5 represents a "sleep" mode with all power removed from disk drive system 20 except for the power necessary to respond to new requests for access.

Reducing power to spindle motor 42 may require other commands to actuator motor 44 to ensure that the heads do not crash into the slowed disk surface. Also, additional reduced-power operating modes may be added to the table shown in FIG. 2 in any useful manner, including such useful operating modes as "chopped" read and write channel power modes, wherein read and write channel power is removed between servo pulses when idling. The method of this invention is not limited to specific powered-down operating modes.

Although the general number and sequence of the operating modes shown in FIG. 2 is presented for illustrative purposes, the availability and sequence of the half-power operating modes-1 and -2 represents an important feature of this invention because both operating modes-1 and -2 conserve power with minimal effect on the availability of disk drive system 20.

FIG. 3 shows an exemplary digital embodiment suitable for implementing energy monitor 28 and energy comparator 36 from FIG. 1. An energy register 46 contains a binary signal 48 representing the average energy consumption $\bar{E}$ for disk drive system 20. Signal 48 is examined by a controller 50 on a regular basis determined by the clock 52. The contents of register 46 are regularly shifted and incremented by a quantity $N_j$ specified by an increment logic 54 in response to disk drive system activity. FIG. 4 provides several exemplary values for $N_j$ corresponding to the estimated energy demands of several disk drive system operations. The $N_j$ values in FIG. 4 are chosen to represent the relative energy consumption of the corresponding operation during a single clock interval. When register 46 overflows, the overflow reset circuit 56 resets register 46 to binary "ones".

Responsive to clock 52, the contents of register 46 are shifted to the right by one bit and compared to an energy profile signal 58 created by the threshold generator 60. Controller 50 tests the comparison between signals 48 and 58 in the single clock interval and generates mode selection signal 38 to command a state-change in disk drive system 20 whenever binary signal 48 falls below energy profile signal 58. The right-shift operation serves to attenuate the effects of aging energy usage contributions to the average energy consumption $\bar{E}$.

FIG. 5 shows an exemplary embodiment of an analog implementation of energy monitor 28 from FIG. 1 based on a thermal sensor 62. All power to disk drive system 20 passes through a resister 64, which is physically coupled to thermal sensor 62 such that the temperature of resister 64 represents the attenuated time-average of energy consumed by system 20. Recent activity gives high temperature, which bleeds away over time. The temperature signal 66 from sensor 62 is presented to a dual comparator 68, wherein it is compared to two temperature thresholds $T_1$ and $T_2$. If temperature signal 66 is less than threshold $T_1$, dual comparator 68 opens switch $SW_1$ and removes power from, for instance, the control electronics (not shown) within disk drive system 20. Similarly, if temperature signal 66 is less than threshold $T_2$, dual Comparator 68 opens switch $SW_2$, thereby removing power from, for instance, the spindle motor (not shown) within disk drive system 20.

FIG. 6A shows a chart illustrating the operation of the circuit in FIG. 5. The temperature of resister 64 is shown as a curve 70 representing the attenuated time-average of the energy consumed by disk drive assembly 20. Thus, under some exemplary operating scenario, temperature signal 66 indicates a temperature value of $T_0$ in FIG. 6A. When usage activity falls, the heat of resister 64 bleeds off into the ambient environment and the temperature falls from $T_O$ as illustrated by solid curve 70 in FIG. 6A. When curve 70 falls below first threshold $T_1$, switch $SW_1$ is opened. As curve 70 falls below second threshold $T_2$, switch $SW_2$ is opened. With both switches $SW_1$ and $SW_2$ open, curve 70 will gradually fall to the minimum "sleep temp." shown in FIG. 6A. The "sleep" temperature remains stable until the next access command is received, which brings disk drive system 20 back up to full-power operating mode.

A second dotted curve 72 in FIG. 6A represents a different disk access sequence and shows how the timing of the power-down of disk drive system 20 adapts to different operating histories. As curves 72 and 70 fall below threshold $T_1$, curve 70 continues to fall because of continued inactivity, eventually crossing second threshold $T_2$ at point A in FIG. 6A. However, curve 72 begins to rise because of a new access, which overrides dual comparator 68 to bring disk drive system 20 to full-power operating mode for a few access operations. As disk drive system 20 operates at full power, curve 72 begins to rise tracking the increasing temperature of resistor 64. Because the temperature of resistor 64 does not quite rise above first threshold $T_1$, the powered-down operating mode is selected immediately after completion of the new access command, causing curve 72 to again fall toward second threshold $T_2$, which it crosses at point B in FIG. 6A. Thus, switch $SW_1$ is opened with no delay following the most recent access for curve 72 because of a sparse usage history whereas a substantial delay was provided by curve 70 in view of the higher initial temperature resulting from the higher usage history for curve 70. Also, $SW_2$ is opened substantially later for curve 72 than for curve 70 because of usage differences.

Figure 6B:
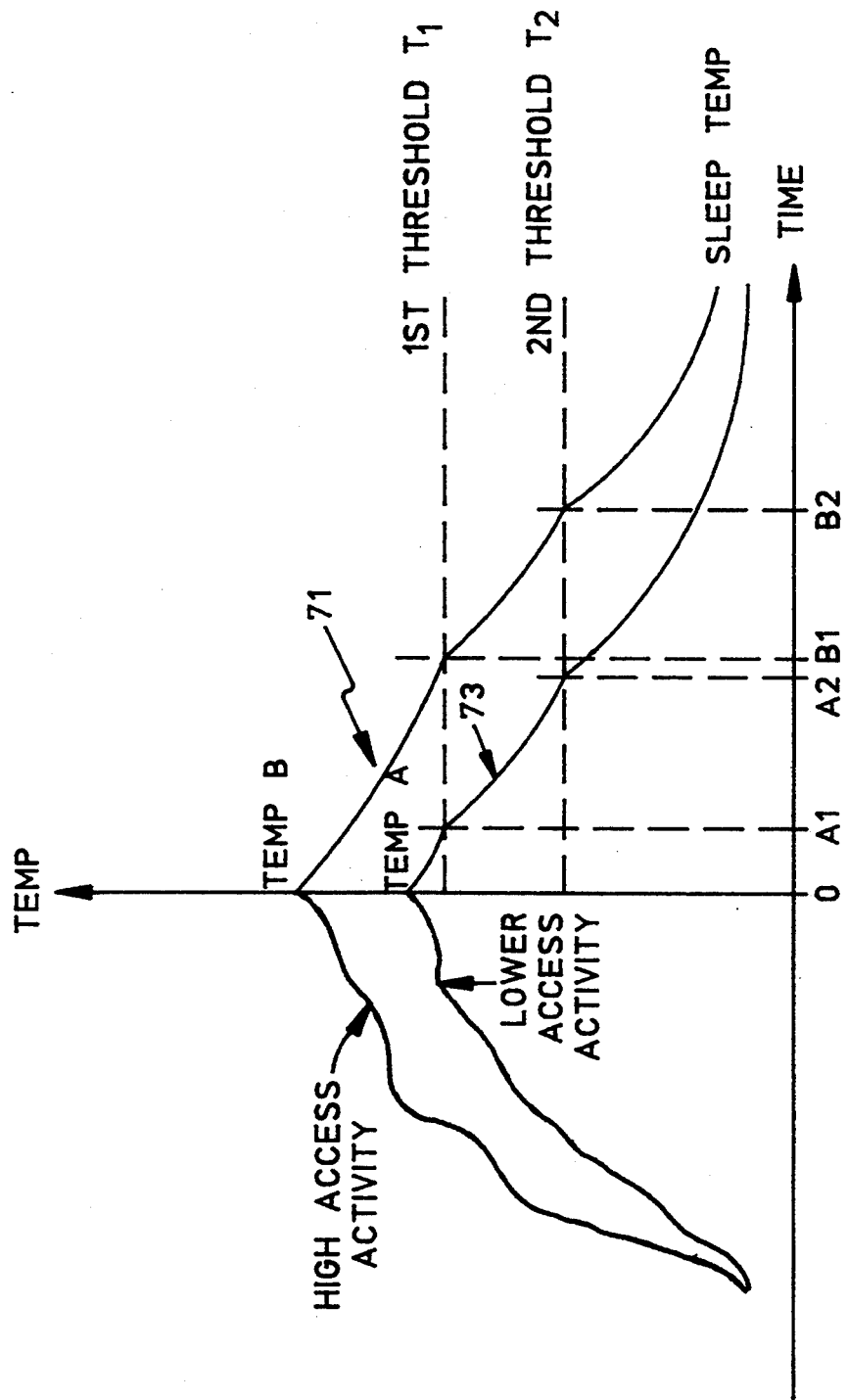

FIG. 6B shows a chart illustrating an alternative operating scenario for the circuit in FIG. 5. Curve 71 in FIG. 6B represents a first profile of the temperature of resistor 64 and curve 73 represents a second profile of the temperature of resistor 64. Curve 71 has a temperature of "TEMP B" at time zero and curve 73 has a lower temperature "TEMP A" at the same time. The two different values for temperature exist because of differing access histories for the two exemplary temperature profiles represented by curves 71 and 73. That is, curve 71 begins at time "zero" with a previous history of high access activity compared to the previous history of curve 73, which exhibits lower levels of access activity.

For the purposes of illustration, FIG. 6B illustrates the temperature of resistor 64 with no access activity after time zero. Thus, curve 71 shows a decline in temperature until the first threshold $T_1$ is crossed at time B1. Curve 73 crosses the first threshold $T_1$ at time A1, which is substantially earlier than time B1. Thus, it is readily appreciated that the opening of switch $SW_1$ is substantially delayed following the last access command when disk drive system 20 has a history of high access activity. Similarly, curve 73 crosses the second threshold $T_2$ at time A2, substantially earlier than the time B2 when curve 71 crosses the second threshold $T_2$. Thus, the later mode changes are also delayed by the higher access activity that occurred before time zero. This example illustrates the adaptive characteristic of the method of this invention.

Figure 7:
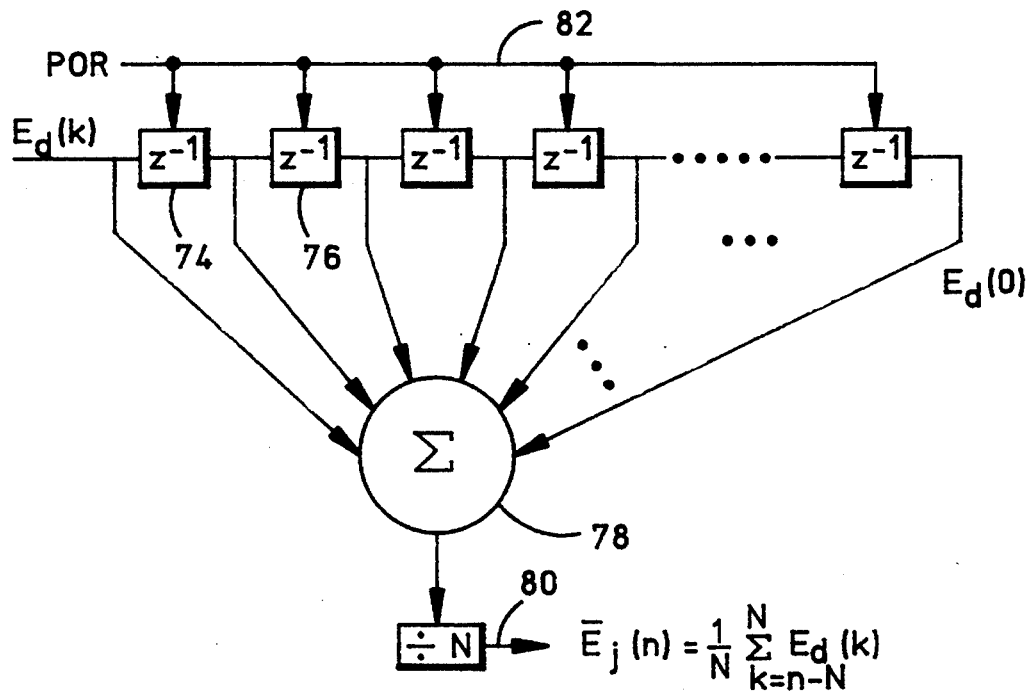
FIG. 7 is a functional block diagram of an alternative digital embodiment of the energy monitor used with the system of this invention.
Figure 8:
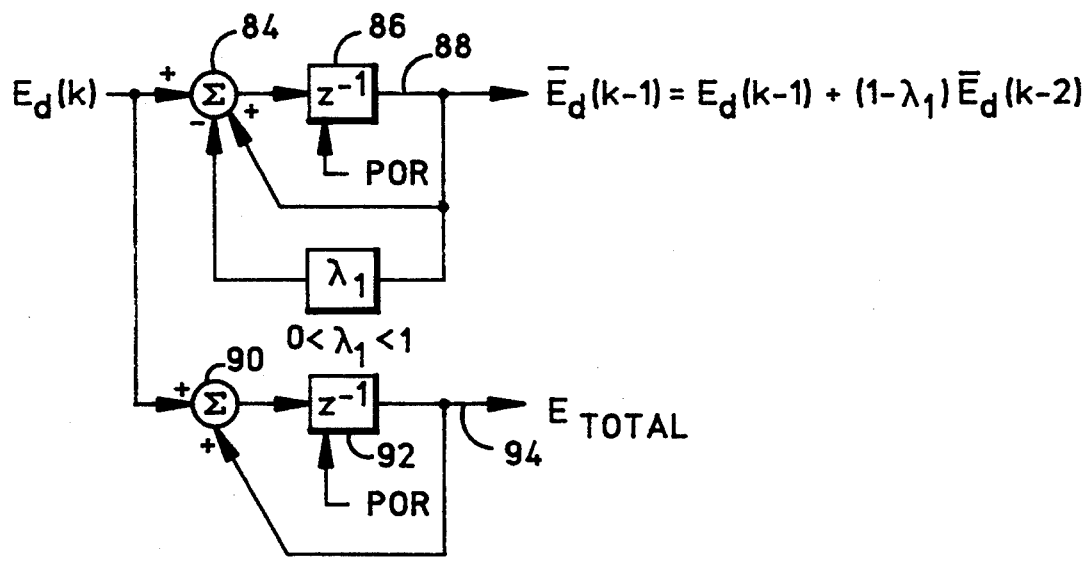
FIG. 8 is a functional block diagram of a second alternative digital embodiment of the energy monitor used with the system of this invention.

FIGS. 7 and 8 show two alternative digital embodiments for energy monitor 28 based on z-transform notation. FIG. 7 shows a group of delay registers exemplified by the delay register 74. The present energy demand signal $E_d(k)$ is shown at the input to delay 74, the output of which represents the once-delayed energy demand signal $E_d(k-1)$ for the preceding sample time interval. As is well-known in the digital arts, delay register 74 can be implemented as a binary register that receives a parallel digital word at the input and holds it for one sample clock cycle before presenting it at the output to the next delay register 76. The effect of this circuit architecture is to present a series of $N=k+1$ energy demand signal samples from the oldest $E_d(0)$ through the newest $E_d(k)$ to a summing circuit 78. The output of summing circuit 78 is divided by N to create an average energy consumption signal 80 representing the arithmetic average $E_f(n)$ of the preceding N samples of the energy demand measured for disk drive system 20 of FIG. 1. Average energy consumption signal 80 is updated to a new value with the beginning of each new sampling clock interval. The group of registers exemplified by delay register 74 are reset by a Power-On-Reset (POR) signal 82 at power-up.

FIG. 8 shows another z-transform embodiment of a digital energy monitor circuit suitable for use with the system of this invention. The primary difference between the embodiments in FIGS. 7 and 8 is that average energy consumption $\overline{E}_f(n)$ signal 80 in FIG. 7 provides equal weight to all of the preceding N samples whereas the embodiment $\overline{E}_d(k-1)$ in FIG. 8 attenuates each such sample as that sample ages. This is accomplished by adding to a new sample of energy consumed $E_d(k)$ at a summing circuit 84 the output $\overline{E}_d(k-1)$ signal 88 of delay register 86, which represents the attenuated average energy consumption incorporating contributions from all previous samples of energy consumed. This summation of a new sample $\overline{E}_d(k)$ and signal 88 is attenuated by subtracting the product of sample 88 and an attenuation factor $\lambda_1$. Thus, for every sample time interval, the product $\overline{E}_d(k-1)$ is subtracted from $\overline{E}_d(k)$ and re-entered into delay register 86. This results in continually decrementing of the older samples of energy consumption until they age into oblivion, thereby "bleeding-off" the aged usage data, emphasizing only the recent usage history in accordance with the method of this invention.

FIG. 8 also shows a summing circuit 90, which continually adds the new energy consumption sample $\overline{E}_d(k)$ to the total accumulation of all previous samples $E_{TOTAL}$ contained in a delay register 92. The total energy consumption signal 94 differs from average energy consumption signal 80 in FIG. 7 by the scaling factor N, which represents the number of accumulated samples in FIG. 7. Delay registers 86 and 92 are reset on overflow and on power-up.

FIG. 9 tabulates several exemplary energy consumption signal values $E_d=E_{OPJ}$ suitable for use with either of the embodiments in FIGS. 7-8. The values for $E_{OPJ}$ in FIG. 9 are selected to represent relative energy consumption for each of the operations OPj shown. The use of a simple look-up table such as that shown in FIG. 9 simplifies the application of the embodiments in FIGS. 7-8 because no true energy measurement is required.

The chart in FIG. 10 illustrates the operation of the embodiments in FIGS. 7-8. Both curves 96 and 98 represent different scenarios for total energy consumption. Signals 80 and 88 (FIGS. 7-8) are functions that decline over a time interval during which relatively little activity occurs in the disk drive system 20 of FIG. 1. As time passes, the absence of access commands causes the average energy $\bar{E}$ values represented by curves 96 and 98 to fall through a first threshold $E_{11}$, which then may enable a mode-change command in the manner discussed above in connection with FIG. 1. Curves 96 and 98 may eventually approach and pierce a second threshold $E_{12}$, thereby enabling yet another mode-change command. The number of mode-change thresholds and the characteristics of curves 96 and 98 are provided for exemplary purposes only to demonstrate the adaptiveness of the system of this invention.

FIG. 11 gives another illustrative embodiment of an analog energy monitor suitable for application as energy monitor 28 in FIG. 1. FIG. 11 embodies a circuit for comparing an actual energy usage characteristic with one or more energy profiles that may be either predetermined or specified by the user. In general, a predetermined energy profile $E_{Ti}$ can be expressed as a power series in the form:

$$E_T(t) = a_0 + a_1 t + a_2 t^2 + \ldots + a_n t^n. \quad [\text{Eqn. 1}]$$

The coefficients $\{a_i\}$ could be preset by the manufacturer of the disk drive apparatus based on anticipated usage patterns or be specified by the user through software or could be made adaptive functions of the varying usage pattern.

In FIG. 11, $I_C$ is a charging current for the capacitor C that is held proportional to the power dissipation (i.e., energy consumed $E_d(t)$). The current $I_D$ is a discharging current that is held proportional to the predetermined energy profile $E_{Ti}$ discussed above. The voltage 100 on capacitor C is first initiated at turn-on by briefly closing switch 102 to set the voltage equal to the battery voltage $V_{BB}$, as illustrated in FIG. 12. Switch 102 can be used to reset the value of voltage 100 whenever desired during operation.

The comparator circuits 104 and 106 generate an output representing the comparison between voltage 100 and voltages $V_{Ti}$ representing the several predetermined energy profiles $E_{Ti}$ provided by the system. FIG. 12 shows changes in state at two points B for comparator 104 and one point A for comparator 106 when voltage 100 crosses the two exemplary energy profiles $E_{T1}$ and $E_{T2}$, respectively. It is an important feature of the system of this invention that the energy consumption profile can be configured as a function of time as exemplified by energy consumption profile $E_{Ti}$ in FIG. 12 and Eqn. 1 above.

Figure 13:
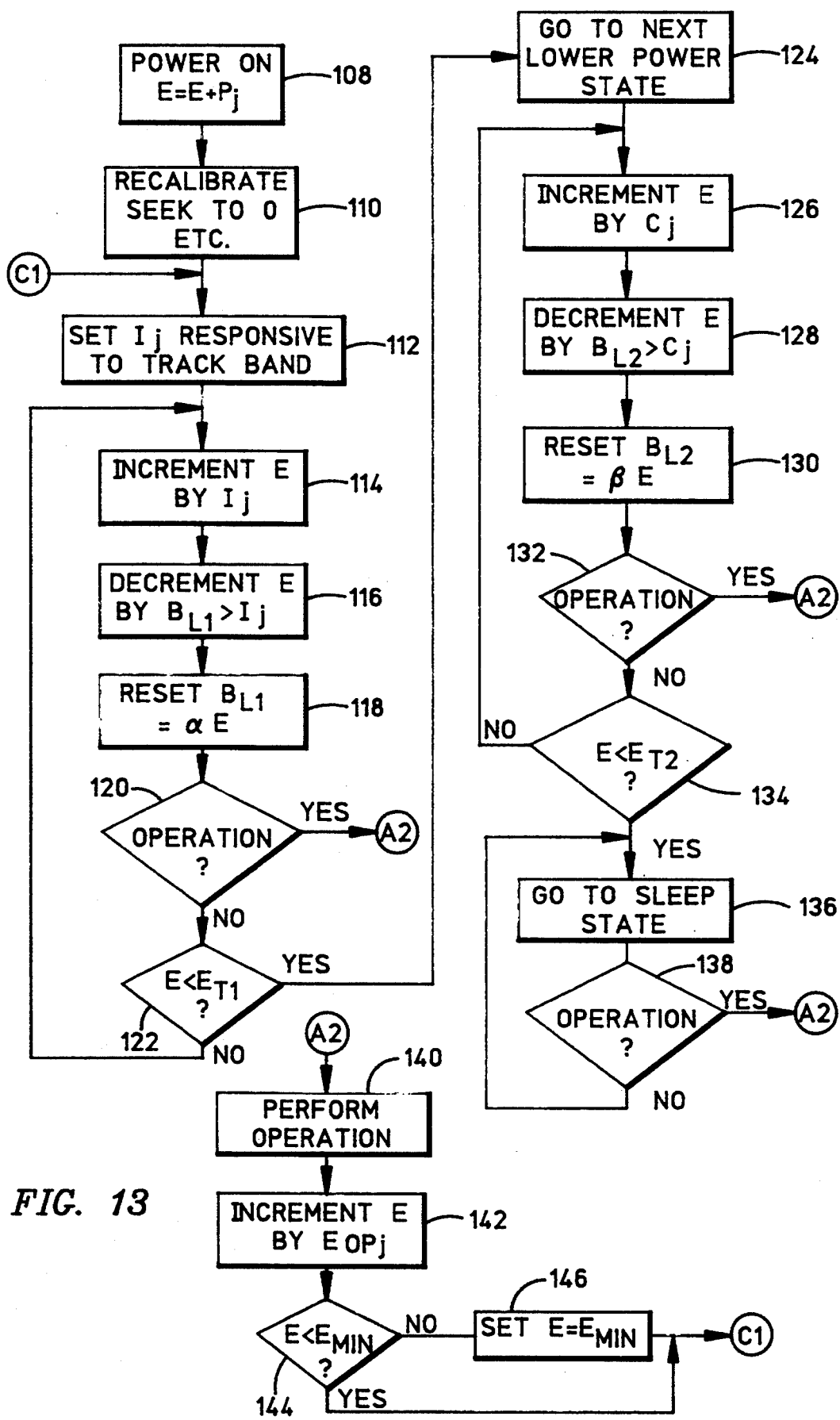
FIG. 13 is a functional block diagram showing an exemplary method for powering-down according to this invention.

FIG. 13 provides a functional block diagram illustrating a method suitable for use with a digital implementation of the energy monitor of this invention similar to those discussed above. For the purposes of the discussion of FIG. 13, the following symbolic definitions are made.

$P_j$ = nominal energy required for power-up operation.

$S_j$ = nominal energy required for one unit interval seek operation.

$R_j$ = nominal energy required for one unit interval read operation.

$W_j$ = nominal energy required for one unit interval write operation.

$I_j$ = nominal energy required to idle at full speed for one unit interval.

$C_j$ = nominal energy required for control electronics alone for one unit interval.

The essence of the method illustrated in FIG. 13 is that an energy register is used to accumulate each of the above values to some maximum value, where the register contents are steadily "bled off" over time to attenuate the aged samples. Thus, the register contents are equivalent to the attenuated average energy discussed above, which can be generically expressed as an attenuated integration of energy over time, such as shown in Eqn. 2.

$$E(t) = \frac{\beta}{T} e^{\alpha T} \int E(t) e^{\alpha T} dt \quad [\text{Eqn. 2}]$$

In FIG. 13, E represents the value of the contents of an "energy" register such as energy register 46 in FIG. 3. In the first step 108, E is incremented by $P_j$ to account for all nominal start-up energy required to attain full power-up. In step 110, all nominal start-up activity is accomplished, including seek recalibration and the like. In step 112, the $I_j$ value is retrieved from a look-up table to account for the relative spindle motor idle power at the track location of the operation. That is, estimated idle power consumption $I_j$ at full spindle power-up varies according to track location of the head actuator.

In step 114, E is incremented by $I_j$ to account for the idle energy consumption for the present time interval. In step 116, E is decremented by a bleed factor $B_{L1}$ that is greater than $I_j$. The value for $B_{L1}$ must be greater than the idle energy consumption and the value should be adjusted to simulate exponential decay of the aging components included in E. This adjustment is illustrated in step 118 as resetting $B_{L1}$ to $\alpha E$.

Step 120 asks if there is an operation required by the system. If the system requests a disk drive apparatus operation, control is transferred to A2 as shown. If no operation is requested during the current time interval, step 122 asks if E is less than the usage threshold value $E_{T1}$. If E has dropped below $E_{T1}$, then the operating state must change and control is transferred to step 124, which initiates power-down to the next lower power state. If the threshold is not yet pierced, step 122 returns control back up to step 114 to begin another time interval and the process repeats around the loop for each subsequent time interval.

For the purposes of this discussion, step 124 is presumed to remove spindle motor power, reducing idle energy consumption to 0. This leaves only the Control electronics energy requirement defined as $C_j$ above. Thus, in FIG. 13, step 126 increments E by $C_j$, representing the control energy required during the current time interval. Step 128 then decrements E by a second bleed factor $B_{L2}$ that is greater than $C_j$. Again, $B_{L2}$ should be adjusted to simulate exponential decay as discussed above in connection with $B_{L1}$. This accomplished in step 130 where $B_{L2}$ is reset to equal $\beta E$, where $\beta$ need not equal $\alpha$.

Step 132 performs the same function as step 120 discussed above and, if an operation is requested, control is transferred to A2 as shown. If no disk access operation request is found, then step 134 compares E to a second threshold $E_{T2}$ and drops into a sleep state if E falls under this second threshold. Step 136 powers-down to the sleep state, remaining sufficiently awake to execute step 138, which is identical to steps 120 and 132. If E has not dropped below the second threshold $E_{T2}$, then control is returned to step 126 and the loop repeats for the next and subsequent time intervals.

In FIG. 13, the transfer to A2 causes execution of the requested operation in step 140, which powers-up to the fully-powered operational state (not shown). After the operation is completed, E is incremented in step 142 by $E_{OP_j}$, which is the energy value estimated for the operation, such as those listed above for read, write, seek and so forth (see, e.g., FIG. 9).

After step 142, E is compared in step 144 to a minimum value $E_{MIN}$ and is reset to that value in step 146 if E does not exceed $E_{MIN}$. If there is a burst of activity, the energy register contents E saturates at a maximum value $E_{MAX}$ (not shown). This prevents a rollover of any excessive energy consumption during peak bursts of activity. Thereafter, control is returned to C1, which directly executes step 112 to reselect the idle energy consumption parameter according to the present track band using a look-up table. The procedure then proceeds as discussed above.

It is readily apparent in view of the above discussion that additional branches representing partially-powered spindle motor operation and partially-powered microprocessor operation can be added to the flow chart shown in FIG. 13 using the general architecture discussed above. Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawing.

We claim:

1. A data storage disk drive system having a plurality of separately-powered components, said system comprising:
   power input means for accepting operating power from a power source;
   energy monitor means coupled to said power input means for creating an energy usage signal $\overline{E}$ representing the average power consumed by said data storage disk drive system over a time interval;
   comparator means coupled to said energy monitor means for creating a plurality of mode command signals each corresponding to said energy usage signal $\overline{E}$ value exceeding the value of one of a plurality of energy usage threshold signals; and
   mode controller means coupled to said comparator means and to said power input means for selecting responsive to said mode command signals one of a plurality of operating modes for said data storage disk drive system, each said operating mode representing the connection of selected ones of said separately-powered components to said power input means.

2. The system of claim 1 wherein said mode controller means further comprises:
   fuzzy logic means for selecting said one operating mode responsive to the recent values of said plurality of mode command signals.

3. The system of claim 1 wherein said comparator means further comprises:
   generator means for creating at least one of said plurality of energy usage threshold signals such that said at least one energy usage threshold signal value varies over time responsive to selection of said one operating mode.

4. The system of claim 1 wherein said plurality of system operating modes includes partial-power modes wherein at least one of said separately-powered components is operated at reduced power.

5. The system of claim 3 wherein said at least one energy usage threshold signal is adjusted responsive to the history of said operating mode selection.

6. A Direct Access Storage Device (DASD) including a plurality of separately-powered components, said DASD comprising:
   power input means for accepting operating power from a power source;
   energy monitor means coupled to said power input means for creating an energy usage signal $\overline{E}$ representing the average power consumed by said data storage disk drive system over a time interval;
   comparator means coupled to said energy monitor means for creating a plurality of mode command signals each corresponding to said energy usage signal $\overline{E}$ value exceeding the value of one of a plurality of energy usage threshold signals; and
   mode controller means coupled to said comparator means and to said power input means for selecting responsive to said mode command signals one of a plurality of operating modes for said data storage disk drive system, each said operating mode representing the connection of selected ones of said separately-powered components to said power input means.

7. The DASD of claim 6 wherein said mode controller means comprises:
   fuzzy logic means for selecting said one operating mode responsive to the recent values of said plurality of mode command signals.

8. The DASD of claim 6 wherein said comparator means further comprises:
   generator means for creating at least one of said plurality of energy usage threshold signals such that said at least one energy usage threshold signal value varies over time responsive to selection of said one operating mode.

9. The DASD of claim 6 wherein said plurality of system operating modes includes partial-power modes wherein at least one of said separately-powered components is operated at reduced power.

10. The DASD of claim 8 wherein said at least one energy usage threshold signal is adjusted responsive to the history of said operating mode selection.

11. An optical disk data storage device including a plurality of separately-powered components, said device comprising:
    power input means for accepting operating power from a power source;
    energy monitor means coupled to said power input means for creating an energy usage signal $\overline{E}$ representing the average power consumed by said data storage disk drive system over a time interval;
    comparator means coupled to said energy monitor means for creating a plurality of mode command signals each corresponding to said energy usage signal $\overline{E}$ value exceeding the value of one of a plurality of energy usage threshold signals; and mode controller means coupled to said comparator means and to said power input means for selecting responsive to said mode command signals one of a plurality of operating modes for said data storage disk drive system, each said operating mode representing the connection of selected ones of said separately-powered components to said power input means.

12. The optical disk data storage device of claim 11 wherein said mode controller means further comprises:

fuzzy logic means for selecting said one operating mode responsive to the recent values of said plurality of mode command signals.

13. The optical disk data storage device of claim 11 wherein said comparator means further comprises:

generator means for creating at least one of said plurality of energy usage threshold signals such that said at least one energy usage threshold signal value varies over time responsive to selection of said one operating mode.

14. The optical disk data storage device of claim 11 wherein said plurality of system operating modes includes partial-power modes wherein at least one of said separately-powered components is operated at reduced power.

15. The optical disk data storage device of claim 13 wherein said at least one energy usage threshold signal is adjusted responsive to the history of said operating mode selection.

* * * * *

UNITED STATES PATENT AND TRADEMARK OFFICE
CERTIFICATE OF CORRECTION

PATENT NO.   : 5,452,277
DATED        : September 19, 1995
INVENTOR(S)  : Christopher H. Bajorek, et. al.

It is certified that error appears in the above-indentified patent and that said Letters Patent is hereby corrected as shown below:

Title page, item [75], inventors:   add -- Michael L. Workman, San Jose, CA-

Signed and Sealed this

Thirtieth Day of January, 1996

Attest:

BRUCE LEHMAN

Attesting Officer          Commissioner of Patents and Trademarks